Patented Feb. 19, 1946

2,395,274

UNITED STATES PATENT OFFICE 2,395,274

ISOMERIZATION PROCESS

John C. Hillyer and Harry E. Drennan, Bartlesville, Okla., assignors to Phillips Petroleum Company, a corporation of Delaware No Drawing. Application January 22, 1942,
Serial No. 427,830

10 Claims. (Cl. 260—683)

This invention relates to the isomerization of olefins. It relates more particularly to a process for the conversion of low-boiling straight chain aliphatic mono-olefins into the corresponding branched-chain-mono-olefins.

The principal object of this invention is to provide a practical and economical process in accordance with which the normal aliphatic olefins of from four to eight or more carbon atoms are converted to the more valuable branched-chain olefins of the same number of carbon atoms. A further object of the invention is to provide a process in which said straight chain olefins undergo isomerization selectively, to the substantial exclusion of the destructive reactions of cracking, polymerization, dehydrogenation, and the like. Numerous other objects will more fully hereinafter appear.

With the rapid rate of development of hydrocarbon technology, isomerization of olefins assumes important aspects. The process of our invention is of great technical importance in that it provides a method for the conversion of the less valuable normal olefins into the more valuable and more reactive branched-chain olefins. Whereas the normal olefins are usually more readily available in large quantity than the iso-olefins, for many uses, such as for starting materials in the manufacture of oxygenated or halogenated hydrocarbon derivatives, and especially for motor fuels of high antiknock value, the iso-olefins are essential, or at least much more desirable. It is especially desirable to convert normal butene into isobutene, which is of great importance to the petroleum industry for the production of high octane aviation fuels.

It is known that normal paraffins can be isomerized to the corresponding isoparaffins by contacting with catalysts comprising metal halides, especially aluminum chloride, aluminum bromide and the like. However, when an attempt is made to apply catalysts of this type, essentially acidic in nature, to the isomerization of olefins, polymerization is found to be the principal reaction occuring. The volatility of these catalysts necessitates the use of temperatures in the range of atmospheric or only slightly higher, and the low reaction velocities and excessively long contact times required to achieve practicable conversions allows opportunity for other reactions, particularly polymerization, to proceed to a very great extent.

It has also been proposed that the isomerization of straight chain to branched-chain olefins be effected in some instances over catalysts comprising phosphoric acid as the active ingredient, by employing substantially lower pressures and contact times, and temperatures above those normally employed when using these same catalysts for polymerization. However, even within the so-called preferred operating range, loss of valuable olefin through undesired polymerization because of the lack of specific action of the catalyst is very considerable, and has prevented development of a process utilizing phosphoric acid catalysts for producing branched-chain olefins instead of liquid polymers.

Other catalysts comprising relatively rare and expensive materials, such as thorium oxide, and the like in synthetic combinations with silica and alumina have been proposed as isomerization catalysts, but have the obvious disadvantages of high cost of preparation and relatively non-selective activity.

We have now found that normal olefins may be converted to the corresponding iso-olefins selectively, and substantially without polymerization or other destructive reactions, by contacting at elevated temperatures with a solid catalyst comprising the readily available and relatively inexpensive naturally occurring mineral bauxite.

The process of our invention comprises contacting the olefin to be isomerized either alone or in admixture with one or more olefins which may or may not be capable of isomerization and/or with one or more substantially inert diluent materials such as saturated hydrocarbons, steam or the like, at tempperatures within the range of from about 5000° to about 13000° F. with a solid catalyst comprising the natural mineral bauxite which preferably has previously been activated or dehydrated by calcining at elevated temperature. The olefin, or olefin-containing mixture is contacted with the catalyst, which may have been treated with various impregnating solutions to modify its activity if desired, at such a rate and pressure that polymerization and other undesirable side reactions are substantially suppressed, i. e., so that not more than about 1.0% and generally not more than about 5% of the material charged is lost by polymerization or other destructive reaction such as cracking, dehydrogenation, etc.

In one specific embodiment our process comprises contacting normal butenes, or mixtures containing substantial quantities of normal butenes, with a catalyst comprising dehydrated natural bauxite at a temperature preferably within the range of from about 700° to about 1100° F., at space velocities between about 100 and about 1500 volumes per volume of catalyst space per hour and at atmospheric to slightly superatmospheric pressures, thereby producing high yields of isobutene.

The catalysts which we have found most useful are those comprising bauxite, or preparations made from bauxite, through relatively simple treatments for activation or deactivation of the material to produce highly selective catalytic properties. Such subsequent treatments of the bauxite in general only slightly modify the activity of the catalyst with respect to isomerization and therefore do not harm the bauxite itself which is the essential catalytic material. Thus natural bauxite, which has been dehydrated by heating to temperatures of 900° to 1300° F. in a stream of inert gas, forms a very satisfactory catalyst for our reaction. Such bauxite which has been treated to remove a part or all of the iron oxide content, as by the process described in our copending application, Serial No. 353,307, filed August 19, 1940, is still satisfactory, and indeed in some instances may yield even more satisfactory results than natural bauxite due to decreased side reactions. Similarly, bauxite which has been impregnated with small quantities of other metallic salts, oxides, or the like, still retains its isomerizing activity. Such treated catalysts are in general less valuable because of lower selectivity due to the catalysis of various side reactions by the added compounds.

Another modified bauxite catalyst which we have found to be particularly valuable in carrying out our process comprises calcined bauxite which has been treated to impregnate it with about one to about ten per cent of an alkali or alkaline earth oxide or hydroxide, especially calcined bauxite containing about two to about five per cent of barium or strontium hydroxide. The preparation of such a catalyst is described in copending application, Serial No. 353,961, filed August 23, 1940, of which we are coinventors with another. In this copending application the use of these catalyts under other conditions for butene dehydrogenation is disclosed, but the present invention embodies a valuable additional development in the use of said catalysts in our preferred operating range to effect olefin isomerization. Neutralization of any acidic material by these alkaline oxides or hydroxides may reduce the undesirable polymerization and thus increase the selectivity of the catalyst action even beyond that of the natural bauxite; and maintained activity in the presence of water vapor is an additional feature of particular advantage when the olefin charge is diluted with steam or water in any form.

Catalysts comprising only aluminum oxide in synthetic preparations, including those catalysts prepared by methods which substantially convert bauxite to aluminum oxide, are not satisfactory catalysts in our process. These synthetic aluminas, although much more expensive to prepare and use, differ with respect to the isomerization of olefins markedly from bauxite, and are very much less active catalysts.

By our process, we find that either butene-1 or butene-2 may be isomerized to isobutylene in good yield. No very marked difference in yield of isobutylene produced has been noted, so that either normal butene or any mixture of the two may serve as a satisfactory charge for our process. More generally, iso-olefins may be produced from any of the various straight chain isomers of a given olefin and any one may serve as starting material in our process.

Isomerization of 1-olenfin to 2-olefins, more specifically of butene-1 to butene-2 over bauxite and certain other neutral salts and/or oxides has been described. This type of reaction, while coming within the general term isomerization, is not to be confused with the reaction of our process, which involves a distinctly different chemical process. Conversion of 1-butene to 2-butenes, or vice versa, leading in either case to the equilibrium mixture at the reaction temperature involves merely the reversible shift of the unsaturated linkage from a position between the end, or α, carbon atom and the adjacent or β, carbon atom to a position between the two centrally located carbon atoms, as illustrated below:

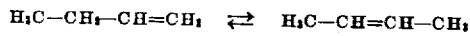

It may also be thought of as merely a redistribution of bond energy within the olefin molecule. Disruption of a carbon-carbon bond with separation of the molecule into two fragments is not necessarily involved in this isomerization. Formation of isobutene from normal butene, on the other hand, involves an actual disruption of a carbon-carbon bond with recombination of the atoms in a different relation to each other, and rearrangement of the open carbon chain, to more branched form, as illustrated for the change of butene-1 to isobutene:

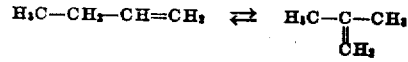

These two reactions, often classed together under the term isomerization, are entirely different from each other and catalytic activity for isomerizing 1-olefin into 2-olefins is not necessarily associated with that for iso-olefin formation.

In the operation of our process, we prefer to use temperatures in the range of from about 700° to about 1100° and preferably 1000° F., although in some cases values from 500° to as high as 1300° F. may be used. The isomerization occurs more rapidly at higher levels but on the other hand not only are destructive cracking reactions, or undesired dehydrogenation reactions very sharply increased, but also the equilibrium mixture of normal and iso-olefins resulting contains less of the iso-olefins. Thus it may be calculated that the following concentrations of isobutene would be present in the equilibrium mixture with normal butenes at the various temperatures listed.

| | Volume per cent |
|---|---|
| 600° F | 49 |
| 700° F | 44 |
| 800° F | 41 |
| 900° F | 38 |
| 1000° F | 36 |
| 1200° F | 34 |
| 1300° F | 33 |

A disadvantage in the use of the lower temperatures of this range, i. e., from about 500° to about 700° F. is that polymerization of olefins to heavier materials is greatly favored by decreasing temperature, i. e. temperature below 700° F. The temperature coefficient of the polymerization reaction velocity is positive, however, and at low temperatures equilibrium conditions may not be approached in practicable contact times. Thus, in the lower part of our operating range appreciable quantities of polymer exist at equilibrium but polymerization reaction velocity is slow and is not appreciably increased by the action of our catalysts. In the upper part of the range the resulting equilibrium concentrations of polymer are small and account for only very minor portions of the olefin charge stock.

In our preferred temperature range we find that isomerization proceeds at a rapid rate, and equilibrium values for the isobutene content are reached in short contact times, while destructive reactions can be readily maintained at negligible levels. Within the preferred temperature range the choice of temperature used will vary with individual operations, depending upon the olefin being treated, the rate of flow, and other factors. In general, the temperature is selected at as low a level as possible in order to minimize destructive reactions. When isomerizing normal butene to isobutene, for example, temperatures of 800° to 1100° F. may be used, or up to 1200° F. if sufficiently high flow rates are employed, because of the resistance of butenes to thermal cracking reactions. Olefins of a greater number of carbon atoms ordinarily are more readily cracked, and when operating upon $C_5$ to $C_8$ mono-olefins we prefer to conduct the isomerization at somewhat lower temperatures up to about 1000° F.

The formation of polymers from the olefins and particularly from the branched-chain products is markedly increased, even in the absence of catalytic materials, by increasing the pressure In order to avoid this undesirable effect we operate our process at relatively low pressures. In general, pressures ranging from substantially atmospheric to slightly superatmospheric pressures of 15 to 100 pounds gage are used, although in some instances pressures below one atmosphere may be used. The favorable effect of reduced pressures may enable the use of conditions beyond those normally satisfactory for a given olefin where an appreciable amount of polymer would otherwise be formed.

We have found that the activity of our bauxite catalysts in isomerizing straight chain to branched-chain olefins is so great that very short contact times may be employed while still attaining substantially equilibrium concentrations of iso-olefins. In our process we employ contact times from about 0.1 to about 10 seconds, preferably within the range from about 0.2 to about 2 seconds. The longer contact times may be employed when low temperatures are used, while contact times of 0.5 second or less are often satisfactory to give substantially equilibrium concentrations of isomers.

When either of the two isomers of normal butene is used as a charge, some isomerization to the other form may occur. In the short contact times we employ, this isomerization is often only partially completed. However, since substantially the same iso-olefin yields may be obtained from either 1-butene or 2-butene, the extent to which the shift of the unsaturated linkage occurs has little effect on the production of isobutene. It is an advantage of our process that such short contact times can be used with the accompanying high throughput of hydrocarbon per volume of catalyst.

To obtain the best possible yields of iso-olefins the length of operating cycle must be carefully controlled. We have found cycles from as short as 15 minutes to as long as two hours or even more to be satisfactory in various cases. Although the deposition of coke and/or tar on the catalyst proceeds at a low rate under the relatively mild conditions and high flow rates which we employ, a deposit slowly builds up on the surface of the catalyst and it becomes less active in promoting the desired isomerization. When the activity as evidenced by the iso-olefin content of the effluent vapors has dropped appreciably, operation of the process is discontinued. The catalyst may be readily regenerated if desired, and by the use of a plurality of catalyst cases, the process may be operated continuously. Economic as well as operating factors will determine the most satisfactory cycle in any individual case, but in general short on-stream periods and relatively frequent reactivation of the catalyst will be found to give the best results.

Reactivation of bauxite catalysts may be readily practiced by methods well known to those skilled in the art. Gases containing free oxygen, generally from one to ten per cent, are employed. We have found it desirable to carry out the reactivating combustion at temperatures between 1100 and 1400° F. Temperatures of about 1500 to 1700° F. should not be exceeded in any case.

We have found that by our process under the preferred operating conditions we obtain yields of iso-olefins substantially equal to the equilibrium concentrations. Thus, in converting butenes, we may obtain from 34 per cent of isobutene at 1200° F. to 44 per cent at 700° F. The polymer formed per pass is normally of the order of about one to three per cent or less of the olefin charge and may be even less, but ordinarily does not exceed about 5 per cent at temperatures above about 700° F. Losses through decomposition reactions are usually proportional to the amount of high-boiling material formed and may be maintained at very low levels. Thus in recycle operations yields of 65 to as high as 95 per cent or even more of the normal olefin treated may be obtained.

If it is desired, the olefin may be treated in admixture with various substantially inert gases, such as carbon dioxide, paraffin hydrocarbons such as methane, ethane, propane, butane, etc., nitrogen, or the like. Of especial value for this purpose is the use of water vapor. Even a small proportion present in the olefin greatly suppresses the rate of polymerization reactions. The amount of water vapor present may vary from a trace up to say about 90 volume per cent of the charge. The recycle yield may thus be markedly improved, or the range of operating conditions may be extended to include lower temperatures at which greater concentrations of iso-olefins are obtained at equilibrium. It is an advantage of our process that the catalysts employed are water-resistant, i. e., they retain their activity at substantially undiminished levels in the presence of considerable quantities of water vapor, in contrast to many types of catalysts whose activity is greatly reduced or even completely destroyed thereby.

In accordance with the present invention the active hydrocarbon content of the charge, i. e., the portion which is subject to conversion under the isomerization conditions described herein, preferably comprises preponderantly or consists essentially of mono-olefins of from 4 to 8 carbon atoms.

The following examples will serve to illustrate specific modes of carrying out the present invention, but it is to be understood that they in no way limit the invention to these specific cases.

Example I

Butene-1 was passed over a 12-20 mesh granular bauxite catalyst which had previously been heated in a stream of air to 1100° F. The butene charge was passed at a space velocity of 500 volumes per hour over the catalyst maintained at 850° F. A sample taken 15 minutes after the start of the reaction had an isobutylene content of 39 per cent. Ninety-five per cent of the charge was recovered in the $C_4$ fraction, indicating a loss of only 5 per cent per pass. At the end of one hour isobutylene content dropped to 30 per cent and the run was discontinued to reactivate the catalyst. Liquid polymer amounted to approximately three per cent of the charge, and efficiency in conversion to isobutylene averaged 88 per cent.

Example II

Butene-1 was passed over the catalyst of Example I, maintained at 700° F. A sample taken shortly after the start of the test, which was carried out at a space velocity of 500 volumes per hour, showed 42 per cent conversion to isobutene, with the formation of 5 per cent liquid polymer and an efficiency of 87 per cent in the conversion to isobutene.

A similar test carried out at 1000° F. showed a total conversion of 42 per cent. The products based on the butene charge comprised 35 per cent yield of isobutene, 1.5 per cent liquid polymer and 5.5 per cent lost by cracking. The efficiency was thus 83 per cent in conversion to isobutene.

Example III

Butene-2 was treated over the catalyst of Example I at a space velocity of 500 volumes per hour and a temperature of 850° F. The yield of isobutene was 38 per cent of the charge, while 2 per cent of the charge was cracked and about 2 per cent converted to liquid polymer. The efficiency was 91 per cent.

Example IV

Butene-1 was diluted with 10 per cent of its own volume of steam and the mixture passed over the catalyst of Example I at a total flow rate of 500 volumes per hour. Conversion to isobutene over a one hour period averaged 38 per cent out of a total conversion of 41 per cent of the charge. Polymer formation amounted to only about one per cent of the charge.

Example V

Butene-1 was treated over a catalyst comprising the calcined bauxite of Example I which had been subsequently impregnated with 2 weight per cent of barium hydroxide. At a temperature of 850° F. and a total flow rate of 500 volumes per hour, conversion was 42 per cent yielding 38 per cent isobutene and only 1.5 per cent liquid polymer.

Example VI

Butene-1 was treated over the catalyst of Example V at a temperature of 1135° F. and a total space velocity of 1200 volumes per hour when diluted with 3 volumes of steam. During a thirty minute operating cycle, isobutene formation averaged 15 per cent while conversion of butene was 25 per cent or an efficiency of 60 per cent in the conversion. Polymer formation was less than one per cent.

Example VII

A $C_4$ fraction comprising approximately 10 per cent butane, 30 per cent butene-1, and 60 per cent butene-2 was treated over a bauxite catalyst at 850° F. and 500 volumes per hour. Thirty-eight per cent of isobutene was obtained, at an efficiency of 85 per cent.

Example VIII

A mixture of normal pentenes in the ratio of approximately one part pentene-1 to two parts pentene-2 was treated over calcined bauxite catalyst at a temperature of 750° F. Steam equivalent to one-third the volume of pentene was mixed with the charge, and a space velocity of 800 volumes per hour was used. The total conversion was about 35 per cent of the charge, and the branched-chain pentenes amounted to about 20 per cent of the charge. Less than five per cent of polymer was formed in a 20 minute operating cycle.

In a similar experiment, normal hexene, diluted with steam, yielded 18 per cent of branched-chain isomers at 700° F. when 33 per cent of the hydrocarbon was converted. Similarly, polymer formation in a 15 minute cycle was less than 5 per cent.

While we have described our invention in a detailed manner and provided specific examples illustrating suitable modes of executing the same, it is to be understood that modifications may be made and that no limitations are intended other than those imposed by the appended claims.

We claim:

1. A process for the selective catalytic conversion of aliphatic olefins of 4 to 8 carbon atoms to isomers of more highly branched chain structure while substantially excluding destructive reactions of cracking, dehydrogenation and polymerization, which comprises passing a hydrocarbon charge wherein the active hydrocarbons subjected to said conversion consist essentially of said aliphatic olefins of 4 to 8 carbon atoms in contact with a catalyst consisting of bauxite at temperatures in the range of from about 500° to about 1300° F. and at pressures ranging from about atmospheric to low super-atmospheric pressures for a reaction period in the range of from about 0.1 to about 10 seconds.

2. A process for the selective catalytic conversion of low-boiling normal olefins of 4 to 8 carbon atoms to the corresponding branched-chain olefins while substantially excluding destructive reactions of cracking, dehydrogenation and polymerization, which comprises passing a hydrocarbon charge wherein the active hydrocarbons subjected to said conversion consist essentially of said aliphatic olefins of 4 to 8 carbon atoms in contact with a catalyst consisting of bauxite at temperatures in the range of from about 500 to about 1300° F. and pressures of from about zero to about 100 pounds gage for a reaction period in the range of from about 0.1 to about 10 seconds.

3. A process for the selective catalytic conversion of normal olefins of 4 to 8 carbon atoms to the corresponding iso-olefins while substantially excluding destructive reactions of cracking, dehydrogenation and polymerization, which comprises passing hydrocarbon vapor mixtures consisting essentially of said normal olefins as the active hydrocarbons subjected to said conversion in contact with a catalyst consisting of bauxite at temperatures in the range of from about 700° to about 1100° F. and pressures in the range of from substantially atmospheric to about 100 pounds gage for a reaction period in the range of from about 0.1 to about 10 seconds.

4. A process for the catalytic conversion of aliphatic olefins of 4 to 8 carbon atoms to the corresponding isomers of more highly branched-chain structure which comprises passing hydrocarbon vapor mixtures containing said aliphatic olefins admixed with substantial quantities of water vapor in contact with a water-resistant catalyst comprising bauxite impregnated with a minor proportion of an alkaline earth hydroxide selected from the group consisting of barium and strontium hydroxides, at temperatures in the range of from about 700° to about 1100° F. and pressures of from substantially atmospheric to about 100 pounds gage for a reaction period in the range of 0.1 to about 10 seconds.

5. A process as in claim 4 in which normal butenes are converted to isobutene.

6. A process for the selective catalytic conversion of normal butenes to isobutene while substantially excluding destructive reactions of cracking, dehydrogenation and polymerization, which comprises passing a hydrocarbon vapor mixture consisting essentially of said normal butenes as the active hydrocarbons subjected to said conversion in contact with a catalyst consisting of bauxite at temperatures in the range of from about 700° to about 1100° F. and near-atmospheric pressures for a reaction period in the range of from about 0.1 to about 2 seconds.

7. A process for the catalytic conversion of aliphatic olefins of 4 to 8 carbon atoms to the corresponding isomers of more highly branched-chain structure which comprises passing hydrocarbon vapor mixtures containing said aliphatic olefins admixed with substantial quantities of inert diluent in contact with a water-resistant catalyst comprising bauxite impregnated with a minor proportion of an alkaline earth hydroxide selected from the group consisting of barium and strontium hydroxides, at temperatures in the range of from about 700° to about 1100° F. and pressures of from substantially atmospheric to about 100 pounds gage for a reaction period in the range of 0.1 to about 10 seconds.

8. A process as in claim 7 in which the catalyst comprises bauxite impregnated with a minor proportion of barium hydroxide.

9. A process as in claim 7 in which the catalyst comprises bauxite impregnated with a minor proportion of strontium hydroxide.

10. A process as in claim 7 in which normal butenes are converted to isobutene.

JOHN C. HILLYER.
HARRY E. DRENNAN.

Certificate of Correction

Patent No. 2,395,274.             February 19, 1946.

JOHN C. HILLYER ET AL.

It is hereby certified that errors appear in the printed specification of the above numbered patent requiring correction as follows: Page 1, second column, line 34, for "tempperatures" read *temperatures*; line 35, for "5000° to about 13000° F." read *500° to about 1300° F.*; page 2, second column, line 4, for "1-olenfin" read *1-olefins*; line 41, for "1-olefin" read *1-olefins*; and that the said Letters Patent should be read with these corrections therein that the same may conform to the record of the case in the Patent Office.

Signed and sealed this 11th day of June, A. D. 1946.

[SEAL]

LESLIE FRAZER,
*First Assistant Commissioner of Patents.* aliphatic olefins of 4 to 8 carbon atoms to the corresponding isomers of more highly branched-chain structure which comprises passing hydrocarbon vapor mixtures containing said aliphatic olefins admixed with substantial quantities of water vapor in contact with a water-resistant catalyst comprising bauxite impregnated with a minor proportion of an alkaline earth hydroxide selected from the group consisting of barium and strontium hydroxides, at temperatures in the range of from about 700° to about 1100° F. and pressures of from substantially atmospheric to about 100 pounds gage for a reaction period in the range of 0.1 to about 10 seconds.

5. A process as in claim 4 in which normal butenes are converted to isobutene.

6. A process for the selective catalytic conversion of normal butenes to isobutene while substantially excluding destructive reactions of cracking, dehydrogenation and polymerization, which comprises passing a hydrocarbon vapor mixture consisting essentially of said normal butenes as the active hydrocarbons subjected to said conversion in contact with a catalyst consisting of bauxite at temperatures in the range of from about 700° to about 1100° F. and near-atmospheric pressures for a reaction period in the range of from about 0.1 to about 2 seconds.

7. A process for the catalytic conversion of aliphatic olefins of 4 to 8 carbon atoms to the corresponding isomers of more highly branched-chain structure which comprises passing hydrocarbon vapor mixtures containing said aliphatic olefins admixed with substantial quantities of inert diluent in contact with a water-resistant catalyst comprising bauxite impregnated with a minor proportion of an alkaline earth hydroxide selected from the group consisting of barium and strontium hydroxides, at temperatures in the range of from about 700° to about 1100° F. and pressures of from substantially atmospheric to about 100 pounds gage for a reaction period in the range of 0.1 to about 10 seconds.

8. A process as in claim 7 in which the catalyst comprises bauxite impregnated with a minor proportion of barium hydroxide.

9. A process as in claim 7 in which the catalyst comprises bauxite impregnated with a minor proportion of strontium hydroxide.

10. A process as in claim 7 in which normal butenes are converted to isobutene.

JOHN C. HILLYER.
HARRY E. DRENNAN.

Certificate of Correction

Patent No. 2,395,274.                                                               February 19, 1946.

JOHN C. HILLYER ET AL.

It is hereby certified that errors appear in the printed specification of the above numbered patent requiring correction as follows: Page 1, second column, line 34, for "tempperatures" read *temperatures*; line 35, for "5000° to about 13000° F." read *500° to about 1300° F.*; page 2, second column, line 4, for "1-olenfin" read *1-olefins*; line 41, for "1-olefin" read *1-olefins*; and that the said Letters Patent should be read with these corrections therein that the same may conform to the record of the case in the Patent Office.

Signed and sealed this 11th day of June, A. D. 1946.

[SEAL]

LESLIE FRAZER,
*First Assistant Commissioner of Patents.*